United States Patent Office 3,432,480
Patented Mar. 11, 1969

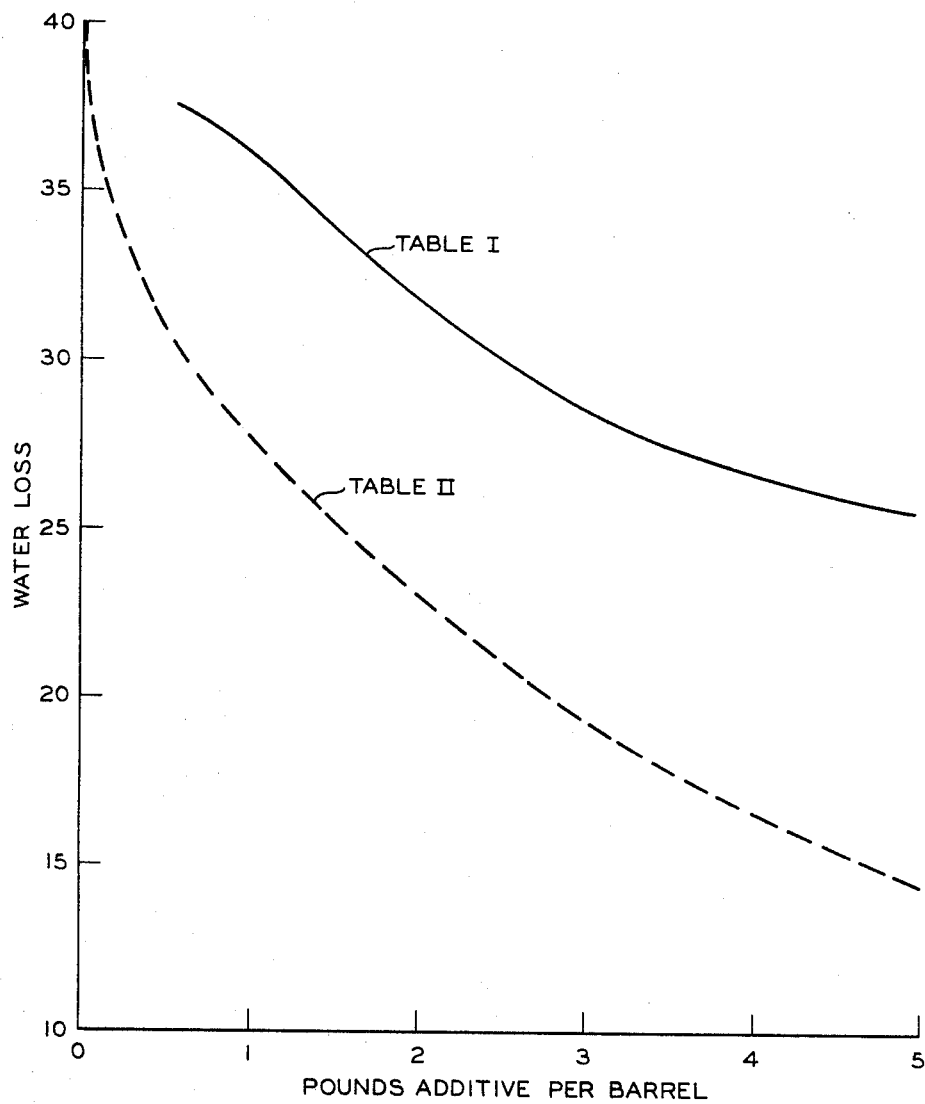

3,432,480
METHOD FOR SULFONATING CIS 1,4-POLYBUTADIENE
Charles A. Stratton, Bartlesville, Okla., assignor to Phillips Petroleum Company, a corporation of Delaware
Filed Aug. 8, 1966, Ser. No. 570,860
U.S. Cl. 260—79.3         5 Claims
Int. Cl. C08d 5/02; C08f 27/07

ABSTRACT OF THE DISCLOSURE

Cis 1,4-polybutadiene is sulfonated. The product is formed by admixture of a solution of $SO_3$ in ethyl phosphate, preferably dissolved in ethylene chloride, and a solution of cis 1,4-polybutadiene dissolved in dried ethylene chloride. Polymer sulfonate acid is recovered by filtering and water washing, following which it is neutralized and dried and powdered. Sulfonated cis 1,4-polybutadiene is useful in a method of drilling a well. It possesses good water loss additive properties.

---

This invention relates to sulfonated cis 1,4-polybutadiene. It also relates to a method of producing the same. Further, it relates to a method of drilling a well.

In one of its concepts, the invention provides a process or method of treating cis 1,4-polybutadiene to sulfonate the same by treating it dissolved in a suitable solvent with sulfur trioxide complexed with a trialkyl phosphate such as triethyl phosphate. In another of its concepts, the invention provides a method for the sulfonation of cis 1,4-polybutadiene by dissolving the same in ethylene chloride and then adding the solution thus obtained, as by heating the materials added together, to a solution made up by adding sulfur trioxide to a solution of triethylphosphate in ethylene chloride. In a still further concept of this invention, it provides a method for drilling a well employing a novel additive.

It is known to treat crude rubber (number one smoked ribbed sheet) dissolved in dry ether with a solution of chlorosulfonic acid in dry ether. It is known to incorporate the salt of sulfonated rubber prepared as just stated to drilling muds.

I have now conceived that cis 1,4-polybutadiene can be sulfonated employing a solution obtained upon admixing sulfur trioxide and, say, triethyl phosphate in an ethylene chloride solvent, and that such procedure has certain desirable advantages over the process employing the chlorosulfonic acid in ether. Thus, I have discovered that cis 1,4-polybutadiene can be sulfonated in ethylene chloride solution, using sulfur trioxide modified with ethyl phosphate [$(C_2H_5)_3PO_4$], to give a product which, when neutralized, gives a water-soluble polymer. This polymer is useful as a mud additive, both as an anti-filtration additive and as a viscosifier.

The sulfonation process of my invention yields a product having better high temperature aging properties, is a more easily workable process and is a considerably safer process.

Thus, an important difference between the prior art and the sulfonation process of the present invention lies in the elimination of the danger involved employing ether as solvent. Further, reaction in the ether-containing system is so rapid that the product builds up as an unmanageable mass on the stirrer. This soon cuts down the efficiency of the stirring process. Further, it is an obstacle to filtration in the usual manner to have this buildup. Indeed, the prior art indicates, respecting the prior art preparation above discussed, that there are difficulties of physical handling of the materials, that a large part of the sulfonated rubber separates from the reaction solution almost immediately upon addition of the reagent solution, and further that insufficient contact with the reagent solution may leave part of the rubber unsulfonated and, therefore, water insoluble. It is explained that the usual difficulty is that the sulfonated rubber separates from the solution almost immediately upon addition of the reagent and soon forms a compact ball on the stirrer so that further contact with the reagent and solution becomes impossible. There is further discussion of the prior art operation in the prior art, including suggestion to add all of the sulfonating reagent solution at once, stirring the rubber solution vigorously and stopping the stirring very quickly thereafter to obtain a spongy form sulfonated rubber, thereby converting nearly all the rubber to a water soluble product.

It is not evident from the prior art here discussed that the materials handling problem has been solved on a pilot plant or commercial scale using the prior art materials.

The dangers involved employing ether which is volatile, very liquid, and which has anesthetic properties, will be readily apparent to one skilled in the art. Ether also has a property of building up peroxides, rendering it extremely hazardous in any process where it must needs be recycled, redistilled, etc.

It is an object of this invention to provide a method for producing sulfonated cis 1,4-polybutadiene. It is another object of this invention to provide a method for producing sulfonated cis 1,4-polybutadiene in which the ease of handling of materials and the danger of the materials involved are substantially reduced. It is a further object of this invention to provide a sulfonated cis 1,4-polybutadiene product which can be used advantageously under elevated temperature conditions, for example, as an additive in high salt, high temperature, drilling muds. Still according to the invention there is provided a novel drilling mud additive. Further and still according to the invention, there is provided a novel method of drilling a well, for example, an oil or gas well.

Other concepts, objects and the several advantages of the invention are apparent from a study of this disclosure, the figure and the appended claims.

According to the present invention, there is provided a sulfonated cis 1,4-polybutadiene product prepared by bringing together a solution of cis 1,4-polybutadiene and a solution of sulfur trioxide and triethylphosphate. In the now preferred form of the invention, the cis 1,4-polybutadiene is comminuted, or, in any event, is dissolved in dried ethylene chloride, solution being accomplished by heating at a suitable elevated temperature, for example, about 50° C., and stirring for a suitable time, for example, 3 to 4 hours. The solution is then cooled to about 25° C. There is another solution prepared by adding sulfur trioxide to a solution of triethylphosphate in ethylene chloride, the latter solution having been cooled to approximately 0° C. The solution containing the polybutadiene is then added over a period of time with virorous stirring to the solution containing the sulfur trioxide. After allowing sufficient reaction time, water is added to kill the reaction, following which precipitated polymer sulfonic acid is filtered, repulped with water, and filtered again. Following this, the precipitate is neutralized with sodium hydroxide, the product is recovered on a drum drier and flakes of product powdered in a disintegrator.

EXAMPLE I

A portion of ethylene chloride was dried with Drierite, and the solid desiccant removed by filtering through paper. A portion of sulfur trioxide was purified of sulfur trioxide polymer by distilling and condensing, with the condenser held at a temperature over 28° C.

A solution "A" was formed by dissolving 20 grams of a comminuted sample of cis 1,4-polybutadiene in 2000 ml. of dried ethylene chloride. Solution was accomplished by heating at about 50° C. and stirring for 3 or 4 hours. The solution was cooled to 25° C.

A solution "B" was formed by adding 30.8 ml. of purified SO$_3$ to a solution of 42.2 ml. of ethyl phosphate in 400 ml. ethylene chloride which had been cooled to approximately 0° C.

Solution "A" was added to solution "B" over a period of 16 minutes, while vigorous stirring was maintained by means of a Brookfield counter-rotating stirrer. An additional 10 minutes of reaction time was allowed, after which 50 ml. of water were added to stop the reaction. The precipitate of polymer sulfonic acid was filtered off on paper, removing the greater part of the ethylene chloride. The precipitate was repulped in 1500 ml. of water and filtered again. Then, the precipitate was repulped in 1500 ml. of water and neutralized with 33.5 ml. of sodium hydroxide solution containing ½ gram of NaOH per ml. The neutral solution was stirred on a gallon-sized Waring Blendor; then the product was recovered on a drum drier. The flakes of product were powdered in an Osterizer.

While in the foregoing example Solution "A" was added to Solution "B," it is within the scope of the invention, though not now preferred, to add Solution "B" to Solution "A".

One skilled in the art in possession of this disclosure having studied the same, especially the foregoing example, will be able to apply a reasonable range of equivalents. For example, some or all of the triethylphosphate may be replaced by tripropyl phosphate. Other solvents than ethylene chloride may be substituted.

In the tables below, there have been compiled mud test results. Table I shows mud test results obtained with the above-described prior art prepared additive. Table II shows mud test results obtained with a product prepared according to the example of the invention given herein. In both cases, the curves plotted are for the data obtained when aged at 350° F. It can be noted upon mere inspection that the water loss for the prior art material at the several amounts of additive per barrel employed was always considerably greater than that for the additive prepared according to the invention.

The data in Table I were obtained as follows, using the prior art operation employing ether.

TABLE I.—MUD TEST RESULTS

| Additive, g | .5 | 1 | 3 | 5 |
|---|---|---|---|---|
| Water, ml | 350 | 350 | 350 | 350 |
| McCracken clay, g | 28.4 | 28.4 | 28.4 | 28.4 |
| Aged overnight at 80° C.: | | | | |
| pH | 8.6 | 8.5 | 8.4 | 8.8 |
| A.P.I. water loss | 20.8 | 20.0 | 17.0 | 18.0 |
| Aged overnight at 350° F.: | | | | |
| pH | 8.0 | 7.9 | 7.6 | 7.1 |
| A.P.I. water loss | 37.4 | 36.4 | 28.6 | 25.6 |

NOTE.—The polymer employed in preparing the sulfonated materials used had a raw Mooney, ML4, at 212° F.

TABLE II

| Additive, g | .5 | 1 | 3 | 5 |
|---|---|---|---|---|
| Water, ml | 350 | 350 | 350 | 350 |
| McCracken clay, g | 28.4 | 28.4 | 28.4 | 28.4 |
| Aged overnight at 80° C.: | | | | |
| pH | 7.6 | 7.4 | 7.1 | 6.9 |
| A.P.I. water loss | 14.6 | 11.0 | 8.4 | 6.6 |
| Aged overnight at 350° F.: | | | | |
| pH | 4.8 | 4.3 | 4.1 | 3.9 |
| A.P.I. water loss | 31.0 | 28.0 | 19.4 | 14.4 |

My invention is carried out by comminuting twenty grams of cis 1,4-polybutadiene in 2000 ml. of ethylene chloride by stirring and heating to about 50° C. to form solution "A." A second solution is made of 400 ml. of ethylene chloride cooled to 0° C. and mixed with 42.2 ml. of triethyl phosphate. 30.8 ml. of SO$_3$ at room temperature is added to the latter solution to form solution "B." There are two moles of SO$_3$ in solution "B" per mole of cis 1,4-butadiene in the solution "A." Solution "A" is added to solution "B" over a period of 16 minutes. The mixture is allowed to set 10 minutes after which 50 ml. of water is added to stop the reaction. The polybutadiene sulfonic acid is filtered away from the ethylene chloride. The filtered product is dried and ground. There are 0.333 mole of triethyl phosphate to one mole of SO$_3$ in the final product.

Reasonable variation and modification are possible in the scope of the foregoing disclosure, the drawing and the appended claims to the invention, the essence of which is that there have been provided a novel sulfonated cis 1,4-polybutadiene, a method for producing the same and a new method for drilling a well.

I claim:

1. A method for sulfonating cis 1,4-polybutadiene which comprises bringing together a solution of cis 1,4-polybutadiene and a solution of sulfur trioxide and triethylphosphate.

2. A method according to claim 1 wherein cis 1,4-polybutadiene is dissolved in ethylene chloride, ethylphosphate is dissolved in ethylene chloride, sulfur dioxide is added to the solution obtained upon dissolving the ethylphosphate in ethylene chloride, and the solution of the cis 1,4-polybutadiene and ethylene chloride is added to the sulfur trioxide containing solution.

3. A method according to claim 2 wherein the polybutadiene solutions obtained by comminuting polybutadiene and dissolving the same with heating and stirring in ethylene chloride and the solution containing sulfur trioxide, ethylphosphate and ethylene chloride is obtained by dissolving ethylphosphate in ethylene chloride cooling to a low temperature and then adding sulfur trioxide.

4. A method according to claim 1 wherein the ethylene chloride which is employed has been dried.

5. A method according to claim 3 wherein the solutions are brought together over a period of time with stirring and wherein upon completion of the reaction precipitate of polymer sulfonic acid formed is washed, neutralized and the product recovered and dried to produce flakes.

References Cited

UNITED STATES PATENTS

| 3,329,660 | 7/1967 | Pitts | 260—79.3 |
| 3,350,380 | 10/1967 | Strobel | 260—79.3 |
| 3,072,618 | 1/1963 | Turbak | 260—79.3 |
| 2,714,605 | 8/1955 | Jones | 260—79.3 |

JAMES SEIDLECK, *Primary Examiner.*

U.S. Cl. X.R.

252—8.55